(12) United States Patent
Temel McKenna et al.

(10) Patent No.: US 10,710,057 B2
(45) Date of Patent: Jul. 14, 2020

(54) PROCESS FOR THE CATALYTIC PREPARATION OF HYDROGEN CYANIDE FROM METHANE AND AMMONIA

(71) Applicant: Haldor Topsøe A/S, Kgs. Lyngby (DK)

(72) Inventors: Burcin Temel McKenna, Hellerup (DK); Poul Erik Højlund Nielsen, Fredensborg (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 16/206,466

(22) Filed: Nov. 30, 2018

(65) Prior Publication Data

US 2019/0091664 A1      Mar. 28, 2019

Related U.S. Application Data

(62) Division of application No. 15/508,615, filed as application No. PCT/EP2015/073269 on Oct. 8, 2015, now abandoned.

(30) Foreign Application Priority Data

Oct. 20, 2014   (EP) .................................... 14189524

(51) Int. Cl.
    *C01C 3/02*         (2006.01)
    *B01J 23/74*        (2006.01)
        (Continued)

(52) U.S. Cl.
    CPC ............. *B01J 23/74* (2013.01); *B01J 23/745* (2013.01); *B01J 23/80* (2013.01); *B01J 23/825* (2013.01);
        (Continued)

(58) Field of Classification Search
    CPC . B01J 23/74; B01J 23/745; B01J 23/80; B01J 23/825; B01J 23/835; B01J 23/94; C01C 3/0229
    See application file for complete search history.

(56) References Cited

U.S. PATENT DOCUMENTS 3,911,089 A    10/1975   Shiraishi et al.
4,423,023 A    12/1983   Velenyi et al.
                (Continued)

FOREIGN PATENT DOCUMENTS

EP   0 299 175 A1   1/1989
FR   2 735 770 A1   12/1996
                (Continued)

OTHER PUBLICATIONS

Y. Pouilloux et al., "Selective Hydrogenation of methyl oleate into unsaturated alcohols Relationships between catalytic properties and composition of cobalt-tin catalysts," Catalysis Today 63, Mar. 17, 2000, pp. 87-100.

(Continued)

*Primary Examiner* — Ngoc-Yen Nguyen
(74) *Attorney, Agent, or Firm* — Blank Rome LLP (57) ABSTRACT

The invention relates to a catalyst material comprising a support, a first metal and a second metal on said support. The first and second metals are in the form of a chemical compound. The first metal is Fe, Co or Ni, and the second metal is selected from the group consisting of Sn, Zn and In. The invention also relates to a process for the preparation of hydrogen cyanide (HCN) from methane ($CH_4$) and ammonia ($NH_3$), wherein the methane and ammonia are contacted with a catalyst according to the invention.

9 Claims, 5 Drawing Sheets

(51) Int. Cl.
*B01J 23/80* (2006.01)
*B01J 23/745* (2006.01)
*B01J 23/825* (2006.01)
*B01J 23/835* (2006.01)
*B01J 37/03* (2006.01)
*B01J 37/18* (2006.01)
*B01J 38/14* (2006.01)
*B01J 23/94* (2006.01)
*B01J 37/00* (2006.01)
*B01J 37/02* (2006.01)

(52) U.S. Cl.
CPC ............ *B01J 23/835* (2013.01); *B01J 23/94* (2013.01); *B01J 37/0009* (2013.01); *B01J 37/0201* (2013.01); *B01J 37/03* (2013.01); *B01J 37/18* (2013.01); *B01J 38/14* (2013.01); *C01C 3/0229* (2013.01); *B01J 2523/00* (2013.01); *Y02P 20/584* (2015.11)

(56) References Cited

U.S. PATENT DOCUMENTS

| | | | |
|---|---|---|---|
| 5,039,643 A * | 8/1991 | Hecht | ...................... B01J 23/40 |
| | | | 423/376 |
| 5,346,775 A | 9/1994 | Jin | |
| 6,221,327 B1 * | 4/2001 | DeCourcy | ................ B01J 8/008 |
| | | | 423/376 |
| 2004/0103813 A1 | 6/2004 | Yorita | |
| 2012/0012085 A1 | 1/2012 | Rowley | |
| 2015/0044122 A1 * | 2/2015 | Zikeli | .................... B01J 19/245 |
| | | | 423/373 |

FOREIGN PATENT DOCUMENTS

GB    2 210 286 A    6/1989
JP    2011-173087 A    9/2011

OTHER PUBLICATIONS

L.C. Grabow et al., "Descriptor-based Analysis applied to HCN synthesis from NH3 and CH4," Heterogeneous Catalysis, Agnew, Chem. Int. Ed., vol. 50, pp. 4601-4605, Apr. 2011.

H. H. Stadelmaier et al., "Ternary Carbides of the Transition Metals Nikel, Cobalt, Iron, Manganese with Zinc and Tin," Acta Metallurgica, vol. 7, Jun. 1959, pp. 415-419.

* cited by examiner

PROCESS FOR THE CATALYTIC PREPARATION OF HYDROGEN CYANIDE FROM METHANE AND AMMONIA

CROSS REFERENCE TO RELATED APPLICATIONS

This is a divisional of U.S. patent application Ser. No. 15/508,615, filed Mar. 3, 2017, now abandoned, which is a 371 of PCT/EP2015/073269, filed Oct. 8, 2015, which claims priority to European Application No. 14189524.3, filed Oct. 20, 2014, the entire disclosures of which are incorporated by reference in their entireties herein.

BACKGROUND OF THE INVENTION

Known processes for producing hydrogen cyanide from methane and ammonia include the oxidative Andrussow process and the non-oxidative methane-ammonia (Degussa/BMA) and Shawinigan processes. The Andrussow process uses either a Pt—Rh or Pt—Ir gauze catalyst; the methane-ammonia (BMA) process uses a Pt gauze catalyst. Both processes require high temperatures: the Andrussow process requires a temperature greater than 1000° C. and the methane-ammonia (BMA) process requires a temperature greater than 1200° C. The Shawinigan process does not use a catalyst and requires the temperature of the process to be kept at greater than 1500° C. Ullmann's Encyclopedia of Industrial Chemistry, Cyano Compounds, Inorganic, 2012, p. 676.

The high temperatures required for the known processes are due to the endothermic nature of the process. However, the competing side reaction of the decomposition of ammonia to nitrogen and hydrogen is also thermodynamically favored at higher temperatures. Angew. Chem. Int. Ed. (2011), 50, 4601-4605.

In order to reduce production costs and competing side reactions, it is an advantage to lower the temperature required for reaction processes. In order to lower the temperature of the process, an exothermic oxidative process such as the Andrussow process may be chosen over an endothermic non-oxidative process. However, the Andrussow process still requires temperatures of greater than 1000° C. and is less safe to operate than the endothermic non-oxidative processes. A safer process is preferable.

An additional advantage in order to reduce production costs would be to lower the cost of the materials used. It is desirable to use alternative, cheaper catalyst metals such as base metals, e.g. Fe, Co, Ni, rather than noble metals such as Pt.

With regard to investigating the use of alternative catalyst metals, Angew. Chem. Int. Ed. (2011), 50, 4601-4605 provides a descriptor-based understanding of trends in activity and selectivity of various catalyst metals with respect to the preparation of hydrogen cyanide from methane and ammonia. The information analyzed is the result of modelling the adsorption energies of carbon and nitrogen on transition-metal surfaces. It should be noted that the results analyzed are theoretical models rather than practical examples.

The article is directed towards Pt catalysts and it is suggested that cobalt (Co), among other metals, would be an active metal towards ammonia adsorption at a temperature of 1100° C. Ammonia adsorption is a precursor step to both hydrogen cyanide production and the competing side reaction of nitrogen production. The theoretical reaction conditions indicate that a catalyst comprising Co would produce significant amounts of nitrogen and would therefore not be selective for hydrogen cyanide production.

Therefore, it is also desirable to provide a process that employs a cheaper catalyst metal and that is selective for the production of hydrogen cyanide.

The described prior art provides processes for the production of hydrogen cyanide from methane and ammonia with gauze catalysts comprising Pt and at temperatures above 1000° C. The present invention provides catalysts comprising a cheaper metal, i.e. Fe, Co or Ni, wherein the catalyst is selective for the production of hydrogen cyanide and is preferably performed at temperatures of less than 1000° C.

The catalysts of the present invention provide additional advantages such as the ability to use cheaper forms of catalysts such as pellets and extrudates.

SUMMARY OF THE INVENTION

The present invention provides a catalyst material comprising a support, a first metal and a second metal on said support, wherein said first and second metal is in the form of a chemical compound, where said first metal is Fe, Co or Ni, and where said second metal is selected from the group consisting of Sn, Zn and In. The first and the second metal form chemical compounds so that there is no substantial amount of free first metal, viz. Fe, Co or Ni, and no substantial amount of free Sn, Zn or In on the support. Instead Fe, Co or Ni forms an alloy with Sn, Zn or In on the support. It should be noted, that the term "a chemical compound" covers a single chemical compound as well more than one chemical compound. Thus, the catalyst material may comprise two or more chemical compounds or phases, e.g. a mixture of chemical compounds.

The catalyst is active for the process of selectively preparing hydrogen cyanide (HCN) from methane ($CH_4$) and ammonia ($NH_3$), preferably at temperatures of less than 1000° C.

The catalyst of the invention comprises Fe, Co or Ni, alumina and a metal selected from the group consisting of. Sn, Zn and In. For example, the support comprises an alumina, a spinel of alumina, an oxide, a carbide, a nitride, or a carbonitride. In an embodiment, the first and second metal form a ternary compound with carbon or nitrogen. Such ternary compound are, e.g., described in "Ternary carbides of the transition metals Nickel, Cobalt, Iron, Manganese with Zinc and Tin", H. H. Stadelmaier and L. J. Huetter, Acta Metallurgica, Vol. 7, June 1959, pp. 415-419.

The first metal of the catalyst may preferably comprise Co. In an embodiment, the first metal comprises Co and the second metal comprises Sn. For example, the first metal is Co and the second metal is Sn. Sn and Co may be in the form of a binary alloy or an intimate mixture of phases within the stable region of the Co—Sn alloys shown in FIG. 1.

Alumina means any form of aluminium oxide, including Boehmite, alpha-alumina and gamma-alumina. Preferably, alpha-alumina forms. It may be possible for any other high temperature stable catalyst carrier; for example: Spinels of alumina, for example $ZnAl_2O_4$ or $MgAl_2O_4$; oxides, for example $CeO_2$, $ZrO_2$; carbides and nitrides.

The catalyst of the invention may be a precursor for an altered or modified catalyst. During activation and/or operation, oxides may be reduced, e.g. turned into carbides or nitrides. This third phase or ternary compounds can originate as nitrides and/or carbides.

The ratio of the weight percent of Co and metal is from about 5:1 to about 1:5, from 5:1 to 1:5, from about 3:1 to about 1:3, from 3:1 to 1:3, is about 1:2.4, is 1:2.4.

In an embodiment, the support of the catalyst is a ferromagnetic support. The support may comprise Co and the second metal may be coated onto the support. When the support is ferromagnetic, heat for endothermal chemical reactions carried in the presence of the catalyst of the invention may be provided quickly by an alternating electromagnetic field surrounding the catalyst.

The present invention is also directed towards the process of preparing hydrogen cyanide (HCN) from methane (CH4) and ammonia (NH3), wherein methane and ammonia are contacted with a catalyst of the invention and the temperature of the process is preferably less than 1000° C.

The process may be carried out at a temperature of less than 1000° C., for example: from 700° C. to less than 1000° C., from 750° C. to 950° C., from 800° C. to 850° C.

The process is carried out in an inert atmosphere, for example in an atmosphere of nitrogen.

Heat for the process may be provided by inductive heating, when the support is a ferromagnetic support used as an inductive heating element in the process. For example, the support comprises Co and the second metal is coated onto the support. Hereby, the catalyst is susceptible for inductive heating which may be generated by an alternating electromagnetic field surrounding the catalyst.

In an embodiment, the support of the catalyst is a ferromagnetic support used as an inductive heating element in the process of preparing hydrogen cyanide from methane and ammonia. The support may comprise Co and the second metal may be coated onto the support.

Further aspects of the invention relate to:

A catalyst comprising Fe, Co or Ni, alumina and a metal selected from the group consisting of Sn, Zn and In, for use in the preparation of hydrogen cyanide (HCN) from methane ($CH_4$) and ammonia ($NH_3$). The catalyst may comprise Co.

The catalyst may comprise Co, alumina and Sn. In one example, the ratio of the weight percent of Fe, Co or Ni to Sn, Zn or In is between about 5:1 and 1:5. As an example, the ratio of the weight percent of Fe, Co or Ni to Sn, Zn or In is about 1:2.4.

DETAILED DESCRIPTION OF THE PREFERRED EMBODIMENTS

Figure 1:
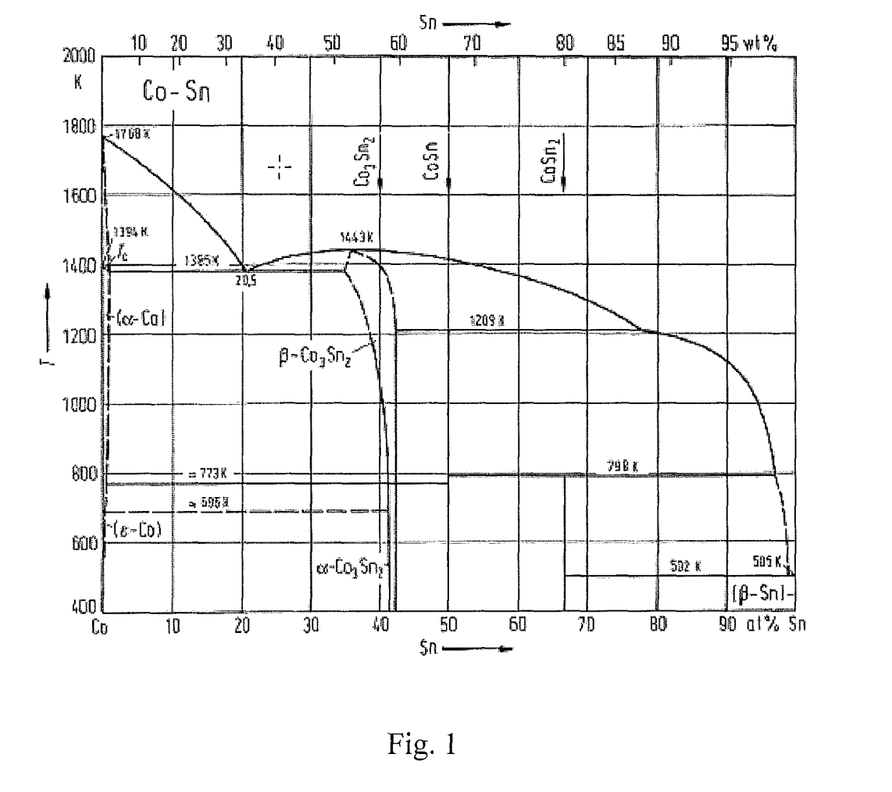
FIG. 1 is Co—Sn phase diagram.

FIG. 1 is Co—Sn phase diagram as seen in FIG. 1, page 370, of Landolt-Börnstein, "Numerical Data and Functional Relationships in Science and Technology", "Group IV: Macroscopic Properties of Matter", Volume 5, "Phase Equilibria, Crystallographic and Thermodynamic Data of Binary Alloys", Subvolume c, Ca—Cd . . . Co—Zr, B. Predel. FIG. 1 shows phase equilibria for Cobalt (Co) and Tin (Sn) for temperatures between 400 and 2000 K; moreover, the Curie temperature $T_c$ is indicated. FIG. 1 is thus an alloy diagram showing the presence of different phases of Sn and Co. A CoSn alloy may contain one or more of these discrete or distinct phases. Such a discrete phase (or a mixture of discrete phases) is also denoted "a chemical compound".

FIGS. 2a-2d are XRD plots of spent catalysts according to the invention.

Figure 2A:
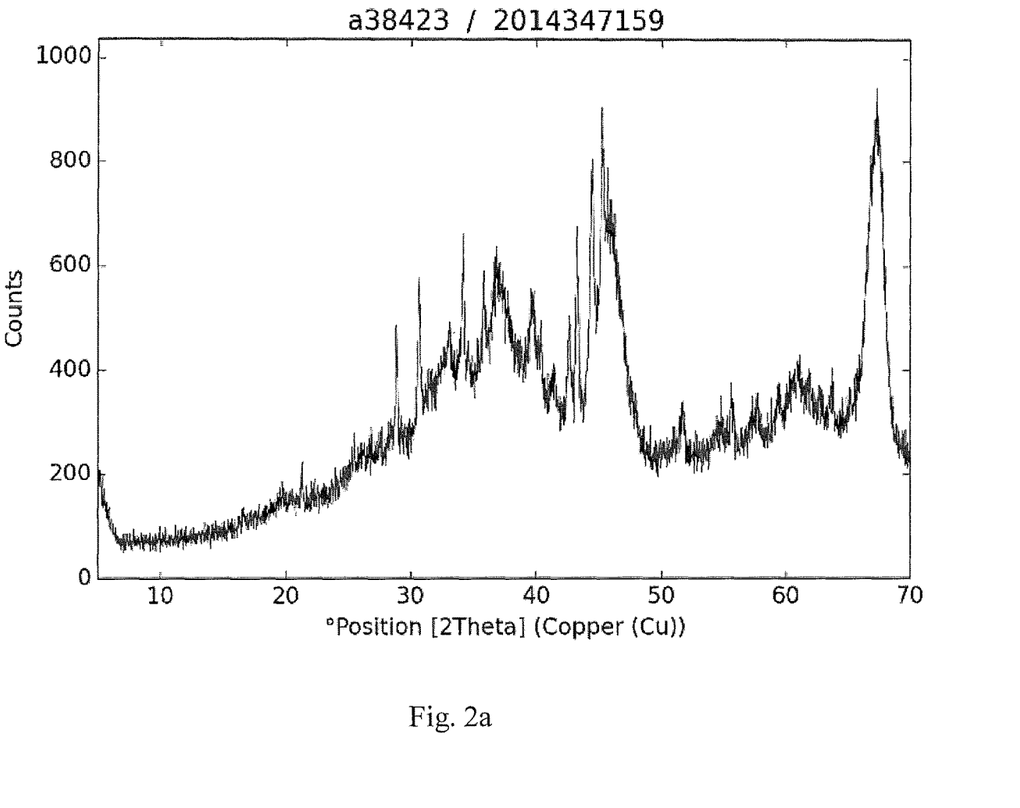
FIGS. 2a-2d are XRD plots of spent catalysts according to the invention.

In FIG. 2a, the main phase is eta/gamma-$Al_2O_3$ giving a high background. The crystalline phases are $Co_3Sn_2$.

Figure 2B:
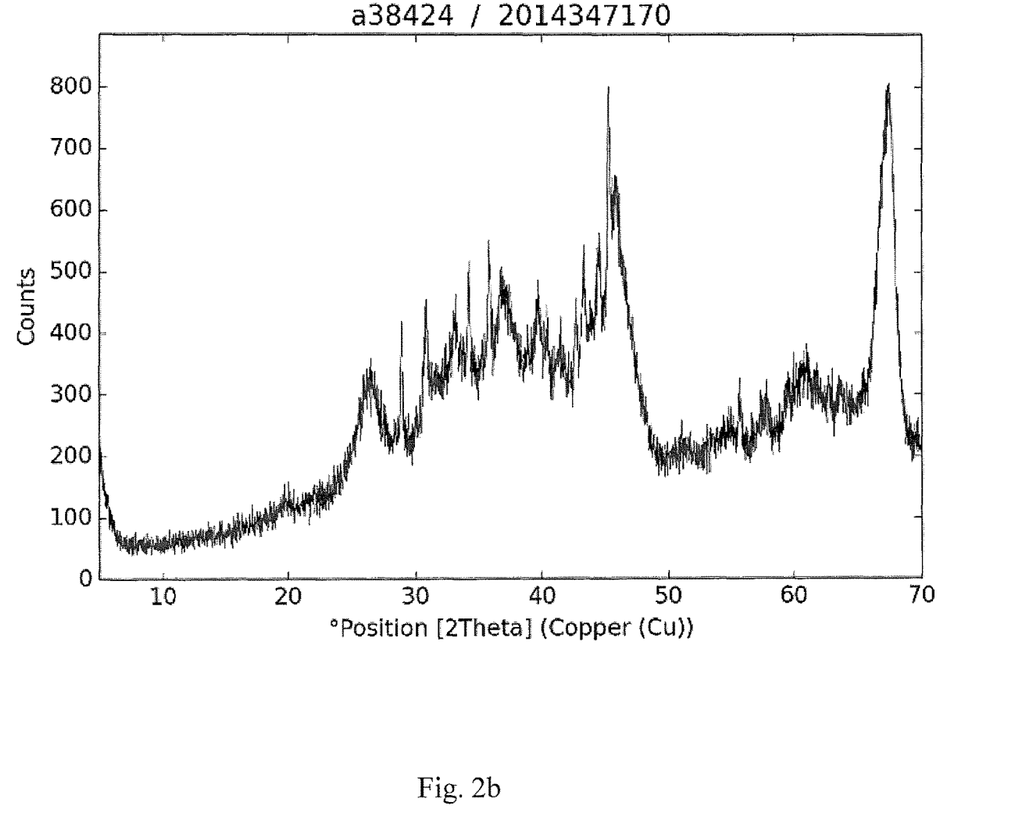

In FIG. 2b, the main phase is eta/gamma-$Al_2O_3$ and amorphous carbon, giving a high background. The crystalline phases are $Co_3Sn_2$, gamma-$Co_{1.5}Sn$, CoSn, beta-$CoSn_3$, $CoSn_2$.

Figure 2C:
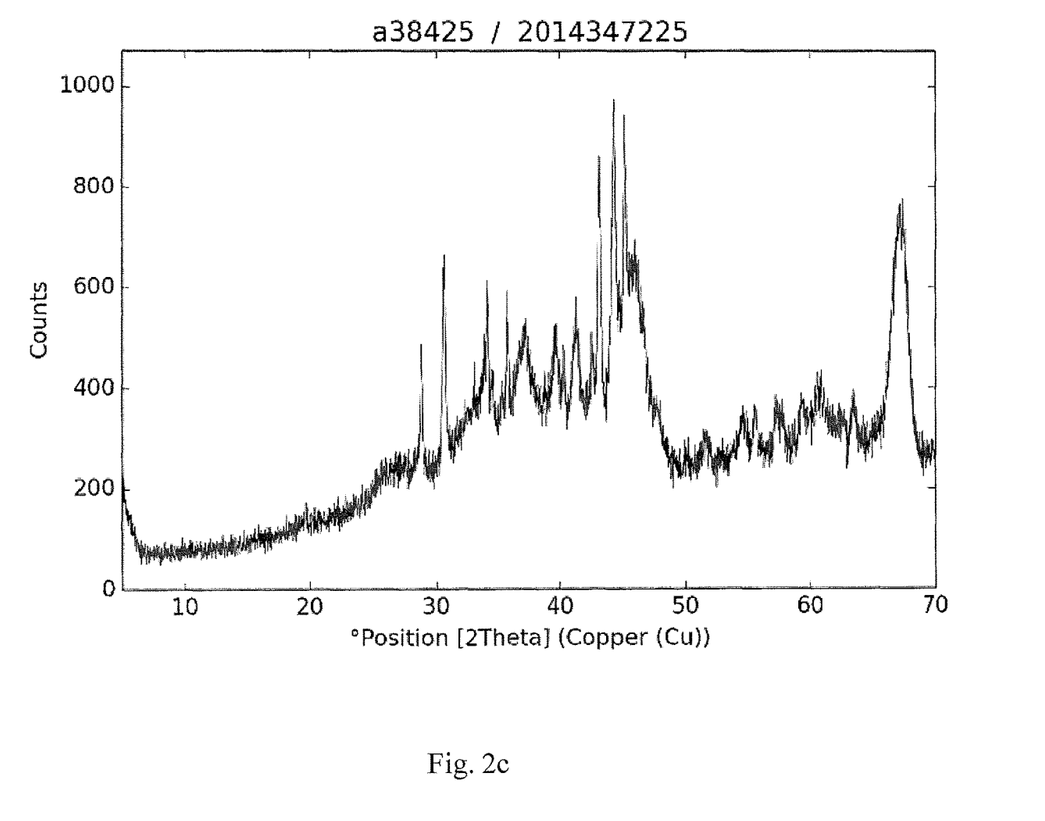

In FIG. 2c, the main phase is eta/gamma-$Al_2O_3$ and some amorphous carbon, giving a high background. The crystalline phases are $Co_3Sn_2$, gamma-$Co_{1.5}Sn$, CoSn, $CoSn_2$, some $Co_3SnC$.

Figure 2D:
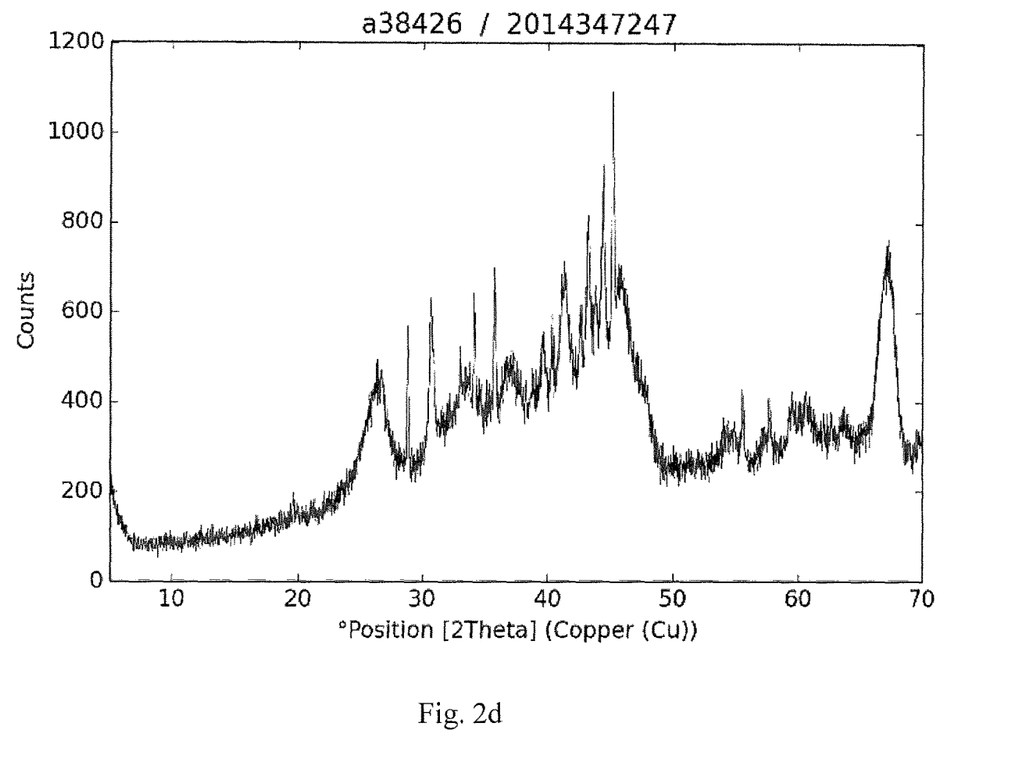

In FIG. 2d, the main phase is eta/gamma-$Al_2O_3$ and amorphous carbon, giving a high background. The crystalline phases are $Co_3Sn_2$, gamma-$Co_{1.5}Sn$, CoSn, $CoSn_2$, some $Co_3SnC$.

For all four FIGS. 2a-2d, the following reference code table applies:

| Ref. Code | Compound Name | Chemical Formula |
| --- | --- | --- |
| A | Aluminum Oxide | $Al_{2.67}O_4$ |
| B | Cobalt Tin | CoSn |
| C | Cobalt Tin | $Co_3Sn_2$ |
| D | Cobalt Tin | CoSn |
| E | Cobalt Tin | $Co_{1.5}Sn$ |
| F | Cobalt Tin | $CoSn_3$ |
| G | Cobalt Tin | $CoSn_2$ |
| H | Cobalt Tin | $Co_{2.9}Sn_2$ |
| I | Cobalt Tin | $Co_{0.75}Sn_{0.25}$ |
| J | Cobalt Tin | $Co_{1.5}Sn$ |
| K | Cobalt Tin | CoSn |
| L | Cobalt Tin Carbide | $Co_3SnC$ |

The compounds denoted B, D and K in the reference code table belong to the same space group (P6/mmm, 191), having hexagonal lattice geometry. However, the lattice constants of the compound denoted B, D and K are slightly different:

B: a=b=5.318 Å, c=4.281 Å
D: a=b=5.234 Å, c=4.166 Å
K: a=b=5.224 Å, c=4.207 Å

For FIG. 2a, the following correspondence table for the XRD plot applies:

| No. | Pos. [°2Th.] | Matched by |
| --- | --- | --- |
| 1 | 21.3129 | D; F |
| 2 | 28.8912 | D |
| 3 | 30.7076 | C; E |
| 4 | 33.0482 | F; G |
| 5 | 34.1929 | C; D |
| 6 | 35.8144 | F; G |
| 7 | 36.7855 | F |
| 8 | 39.6646 | A; B; C; D; |
| 9 | 40.4455 | D; F |
| 10 | 41.4629 | C |
| 11 | 42.6526 | F |
| 12 | 43.2483 | C; D; E; F |
| 13 | 44.4384 | B; C; E |
| 14 | 45.1853 | C; G |
| 15 | 46.0467 | A; C; F |
| 16 | 51.7242 | C; E |
| 17 | 54.6983 | B; C; E; F; G |
| 18 | 55.6067 | C |
| 19 | 57.7476 | C; G |
| 20 | 59.4127 | C; E |
| 21 | 60.9443 | A; F |
| 22 | 63.6334 | C; E |
| 23 | 67.2179 | C; D; F |
| 24 | 67.6378 | C; D; F |

For FIG. 2b, the following correspondence table for the XRD plot applies:

| No. | Pos. [°2Th.] | Matched by |
|---|---|---|
| 1 | 19.6156 | A; G |
| 2 | 28.7071 | B; F |
| 3 | 30.5965 | J; F |
| 4 | 32.832 | G; F |
| 5 | 34.0318 | H |
| 6 | 35.6749 | G; F |
| 7 | 39.4727 | A; C |
| 8 | 40.2587 | G; F |
| 9 | 41.3136 | L |
| 10 | 42.4853 | H; F |
| 11 | 43.1009 | J; F |
| 12 | 44.3631 | B; J; C |
| 13 | 45.0056 | G |
| 14 | 45.7432 | A; F |
| 15 | 55.4584 | C |
| 16 | 57.6292 | G; C |
| 17 | 59.3768 | J; C |
| 18 | 62.5413 | H; G; F |
| 19 | 63.4204 | I; J; F |
| 20 | 67.0942 | A; F |
| 21 | 69.7642 | B; F |

For FIG. 2c, the following correspondence table for the XRD plot applies:

| No. | Pos. [°2Th.] | Matched by |
|---|---|---|
| 1 | 19.6888 | A; K; G |
| 2 | 28.8465 | K |
| 3 | 30.5823 | E; F |
| 4 | 30.689 | E; J |
| 5 | 34.1462 | K |
| 6 | 34.596 | E; K; F |
| 7 | 35.7666 | G; F |
| 8 | 37.2334 | F |
| 9 | 39.6721 | A; K |
| 10 | 40.3821 | K; F |
| 11 | 41.3957 | L |
| 12 | 42.5934 | F |
| 13 | 43.1948 | E; K; F |
| 14 | 44.3628 | E; |
| 15 | 45.2055 | K; G |
| 16 | 46.0544 | A; F |
| 17 | 47.7699 | K; F |
| 18 | 51.7781 | E; F |
| 19 | 54.4895 | E; L; G; F |
| 20 | 55.6058 | C |
| 21 | 57.2297 | E; A; J |
| 22 | 59.319 | J |
| 23 | 60.6774 | A; G; F |
| 24 | 62.5686 | G; F |
| 25 | 63.4965 | E; F |
| 26 | 67.063 | A; F |

For FIG. 2d, the following correspondence table for the XRD plot applies:

| No. | Pos. [°2Th.] | Matched by |
|---|---|---|
| 1 | 19.6306 | K; A; G |
| 2 | 28.8349 | K |
| 3 | 30.6535 | E; C |
| 4 | 33.0501 | G; F |
| 5 | 34.1283 | K |
| 6 | 35.7544 | G; F |
| 7 | 37.1051 | C; F |
| 8 | 39.5928 | K; C; A |
| 9 | 40.3438 | F |
| 10 | 41.3497 | L |
| 11 | 42.6181 | F |
| 12 | 43.2328 | E; K; C; F |
| 13 | 43.8319 | G; F |
| 14 | 44.4379 | E; C |
| 15 | 45.162 | C; G |
| 16 | 45.9434 | C; A; F |
| 17 | 47.9066 | K; C; L; F |
| 18 | 54.3276 | C; L; F |
| 19 | 55.5601 | C |
| 20 | 57.6956 | C; G |
| 21 | 59.4596 | E; C |
| 22 | 60.7162 | C; A; F |
| 23 | 62.6767 | C; G; F |
| 24 | 63.5352 | E; C |
| 25 | 67.2371 | C; F |

EXAMPLES

General Catalyst Preparation:

The catalyst for the invention can be prepared by impregnating salt solutions of the first metal, e.g. Co, and the second metal onto the support. Catalyst Preparation Science and Engineering, Edited by John Regalbuto, CRC Press, 2007, page 341, and Preparation of Catalysts I: Scientific Bases for the Preparation of Heterogeneous Catalysts edited by G. Poncelet, P. A. Jacobs, B. Delmon, pages 430-440, disclose exemplary catalyst preparations via an impregnation process. The salt solutions can be nitrates, chlorides, sulfides or organic complexes. After the impregnation the catalyst is dried between 80° C. and 150° C. and calcined between 500° C. and 700° C. The catalyst is reduced prior to the reaction by exposing it to $H_2$ at a temperature of between 600° C. and 900° C. The catalyst mixture can also be prepared by coprecipitation of the relevant compound precursors. The catalyst can be shaped as pellets, extrudates or crushed into granules after the drying step. During the reduction, the catalyst of the invention forms an alloy (or a mixture of alloys) in the form of one or more bimetallic mixtures. During the reaction, the catalyst may form a ternary alloy with carbon, e.g. $Co_3SnC$, or with nitrogen, e.g. CoSnN.

General Hydrogen Cyanide (HCN) Preparation:

The catalyst is prepared by reduction under an $H_2$ atmosphere. Preheated streams of $CH_4$ and $NH_3$ were mixed and sent to the reactor containing a catalyst comprising a carrier or a support and bimetallic compound or component at a temperature of between 750° C. and 1000° C. At the exit of the reactor the outlet effluent was cooled to condense the hydrogen cyanide (HCN). The residual gas may be treated or recycled. The catalyst may be regenerated by oxidation under an $O_2$ atmosphere.

Examples 1-8

The catalyst was reduced at 850° C. in a flow of 10% $H_2$ in $N_2$ (using a flow rate of about 900 NmL/min) for 4 hours.

The carrier is calcined alumina and the bimetallic compound or component is Co and Sn.

The $CoSn/Al_2O_3$ catalysts were pressed into pellets (13 mm diameter, 3.5 mm height) and then the pellets were divided into fragments of ⅙ to ½ of the original size.

The catalyst was regenerated with 1000 Nml/min of 21% $O_2$ in $N_2$ while the temperature was increased from 100° C. to 850° C. at a rate of 5° C. per minute.

During the experiment, the gas product was analyzed for $H_2$, $CH_4$ and HCN content by a gas chromatograph equipped with a HayeSep Q column and a TCD detector. The $CH_4$ concentration was measured through one separate GC program, while the HCN was measured through another.

TABLE 1

The preparation of hydrogen cyanide from methane and ammonia in the presence of a catalyst comprising Co, Sn and alumina.

| Example | Co:Sn (wt) | Flow (Nml/min) | Temperature ° C. | HCN (exit vol %) | $CH_4$ (exit vol %) |
|---|---|---|---|---|---|
| 1 | 5:12 | 897 | 750 | 0.0 | — |
| 2 | 5:12 | 897 | 850 | 0.275 | — |
| 3 | 5:12 | 897 | 950 | 0.297 | — |
| 4 | 10:24 | 897 | 850 | 0.340 | 9.01 |
| 5 | 10:24 | 445 | 850 | 0.590 | 8.08 |
| 6 | 10:24 | 303 | 850 | 0.540 | 7.53 |
| 7 | 10:24 | 897 | 950 | 0.227 | 8.01 |
| 8 | 10:24 | 445 | 950 | 0.259 | 7.46 |

The $CH_4$:$NH_3$ vol %/vol % is 10:10.

TABLE 2

The preparation of hydrogen cyanide from methane and ammonia in the presence of a catalyst comprising Co, Sn and alumina.

| Example | Co:Sn (wt) | Flow (Nml/min) | Temperature ° C. | HCN (exit vol %) | $CH_4$ (exit vol %) |
|---|---|---|---|---|---|
| 9 | 10:24 | 750 | 750 | 0.0 | 60 |
| 10 | 10:24 | 750 | 850 | 1.3 | 52 |
| 11 | 10:24 | 750 | 900 | 2.2 | 48.5 |
| 12 | 10:24 | 750 | 950 | 1.2 | 49 |

In the examples 9-12, the $CH_4$:$NH_3$ vol %/vol % is 70:30.

The invention claimed is:

1. A process for the preparation of hydrogen cyanide (HCN) from methane ($CH_4$) and ammonia ($NH_3$), wherein the methane and ammonia are contacted with a catalyst material comprising a support, a first metal and a second metal on said support, wherein said first and second metal are in the form of an alloy, where said first metal is Fe, Co or Ni, and where said second metal is selected from the group consisting of Sn, Zn and In, and the temperature of the process is between 850° C. and 1000° C.

2. A process according to claim 1, wherein the temperature of the process is between 850° C. and 950° C.

3. A process according to claim 1, wherein the support is a ferromagnetic support used as an inductive heating element in the process.

4. A process according to claim 1, wherein the support comprises an alumina, a spinet of alumina, an oxide, a carbide, a nitride, or a carbonitride.

5. A process for the preparation of hydrogen cyanide (HCN) from methane ($CH_4$) and ammonia ($NH_3$), wherein the methane and ammonia said support, wherein the first and second metal form a ternary compound with carbon or nitrogen, where said first metal is Fe, Co or Ni, and where said second metal is selected from and 1000° C.

6. A process according to claim 1, wherein the first metal comprises Co.

7. A process according to claim 1, wherein the first metal comprises Co and the second metal comprises Sn.

8. A process according to claim 1, wherein the ratio of the weight percent of Fe, Co or Ni to Sn, Zn or In is between 5:1 and 1:5.

9. A process according to claim 1, wherein the ratio of the weight percent of Fe, Co or Ni to Sn, Zn or In is 1:2.4.

* * * * *